United States Patent

Theodorsen

[15] 3,642,400
[45] Feb. 15, 1972

[54] APPARATUS FOR ENCAPSULATING AN ARTICLE WITHIN MOLDED POLYURETHANE

[72] Inventor: Theodore E. Theodorsen, Manhasset, N.Y.

[73] Assignee: Kurt Salmon Associates, Inc., New York, N.Y.

[22] Filed: Nov. 6, 1969

[21] Appl. No.: 874,563

[52] U.S. Cl. ...................................425/129, 249/162, 425/4, 425/330
[51] Int. Cl. ..........................................................B29c 3/04
[58] Field of Search ................18/1 D, 2 HA, 5 E, 5 BB, 5 F, 18/5 P, 30 CK, 30 CV, 20 R; 249/91, 161, 162; 279/112, 123; 269/2, 118; 264/45, 46

[56] References Cited

UNITED STATES PATENTS

| | | | |
|---|---|---|---|
| 785,272 | 3/1905 | Robbins | 249/161 X |
| 1,678,266 | 7/1928 | Niestradt | 249/157 |
| 2,711,580 | 6/1955 | Conway | 279/112 X |
| 2,892,214 | 6/1959 | McCarthy | 18/30 CV |
| 3,049,769 | 8/1962 | Schultz | 249/157 |
| 3,366,995 | 2/1968 | Dijken et al | 249/91 X |

Primary Examiner—H. A. Kilby, Jr.
Attorney—Curtis, Morris and Safford

[57] ABSTRACT

An apparatus for encapsulating an article within a plastic foam material, such as polyurethane, wherein the article to be packaged is placed within a mold cavity of an adjustable mold, the walls of the mold are adjusted according to the size of the article and a liquid polymeric-isocyanate mix is injected into the mold cavity and allowed to react to form an insoluble, flexible, polyurethane foam which completely encapsulates the article. After the urethane has set, the mold walls are retracted and the encapsulated article is removed. The apparatus consists of a mold form having a baseplate and four upstanding movable sidewalls which define a mold cavity. Each upstanding wall is movable with respect to the other walls thereby to allow for a wide variation in the size of the mold cavity to accommodate wide variations in article size. In addition, a plurality of similar mold forms are provided to rotate on a carousel about a central, liquid polymeric-isocyanate distribution system so that after the liquid has been injected into a mold, the mold may be moved away and the polyurethane allowed to set while liquid is injected into the remaining molds. In this manner, a continuous production line operation may be maintained.

9 Claims, 4 Drawing Figures

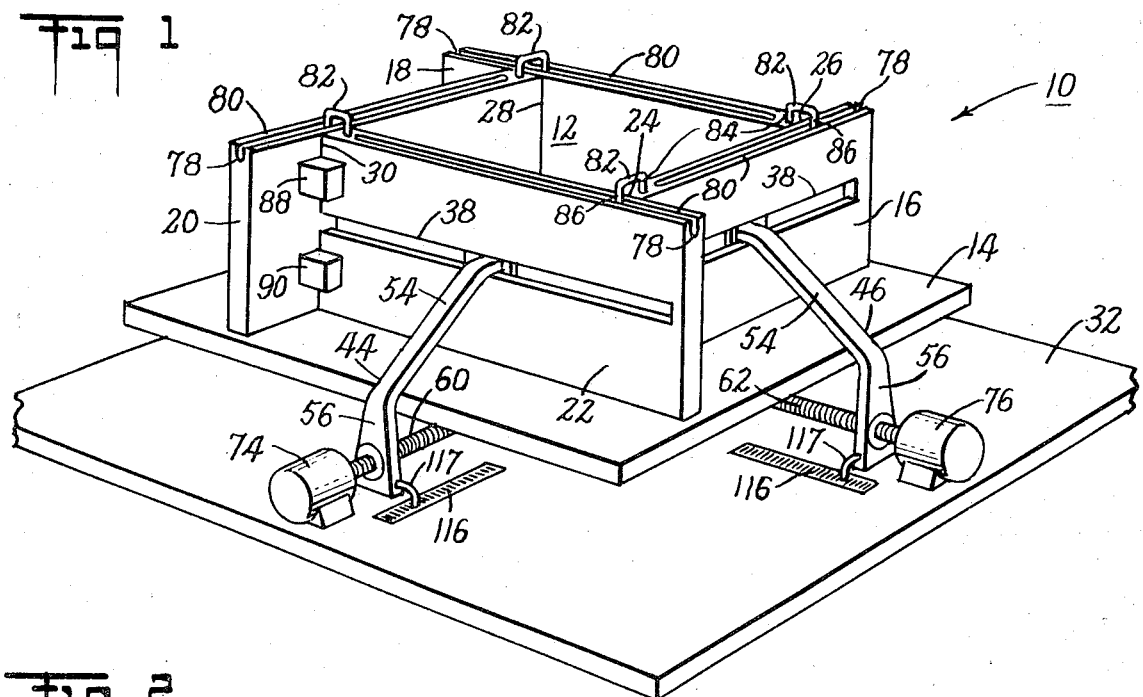
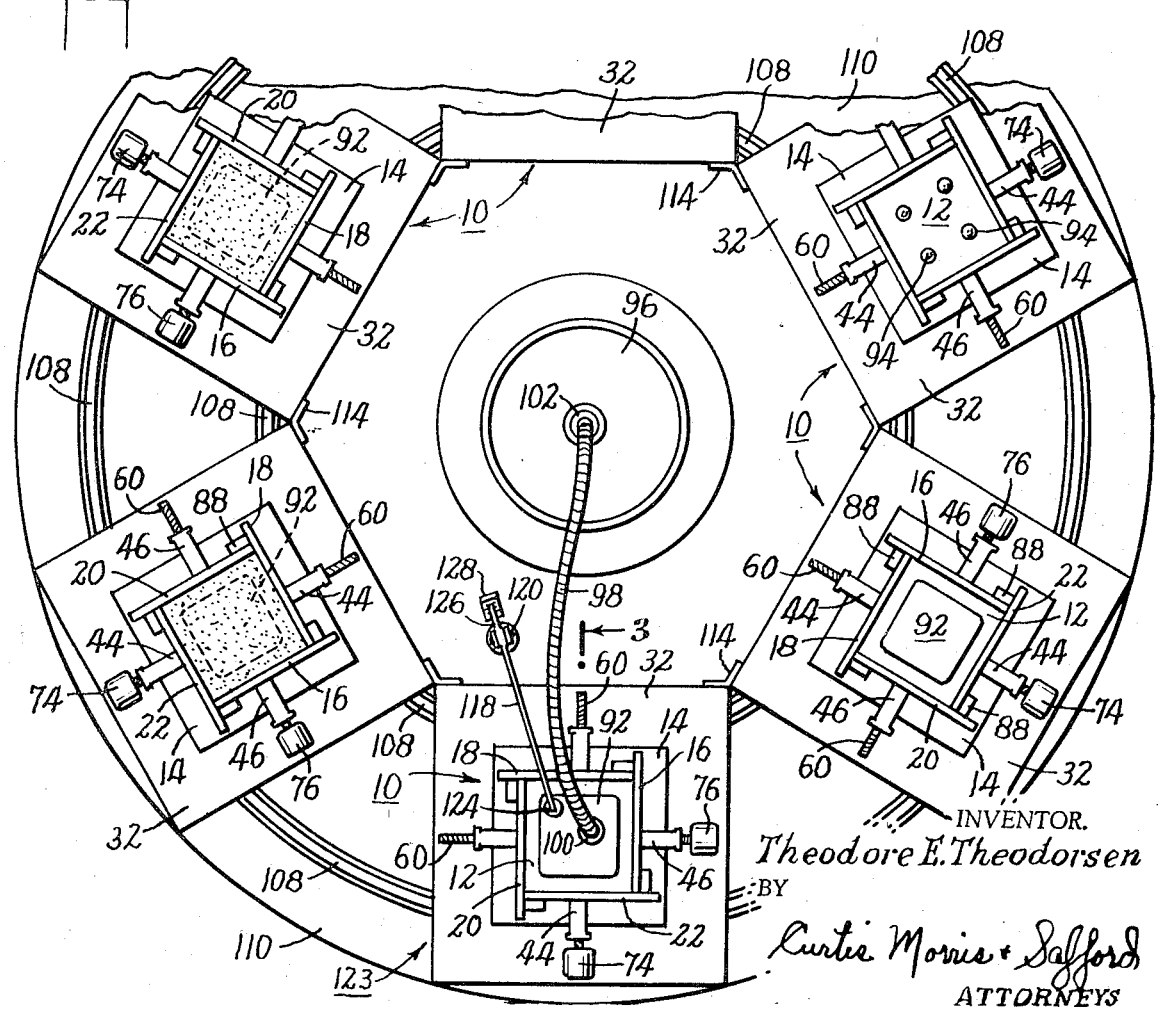

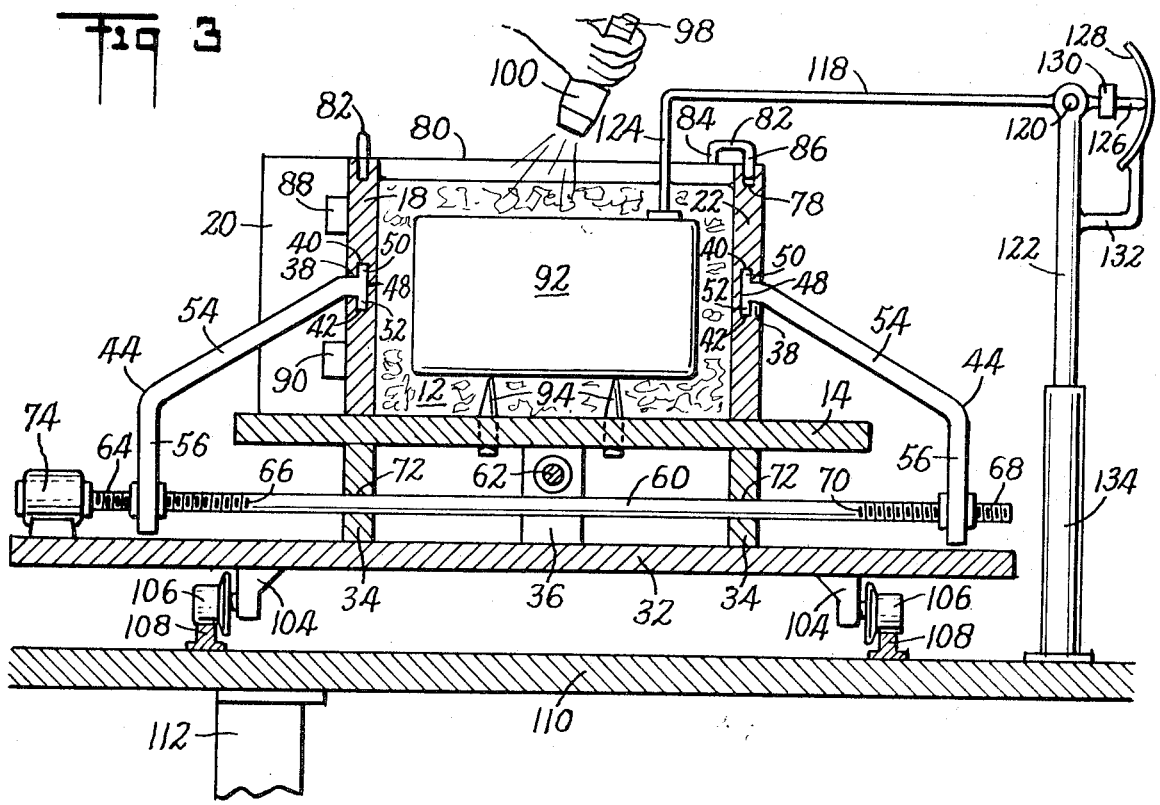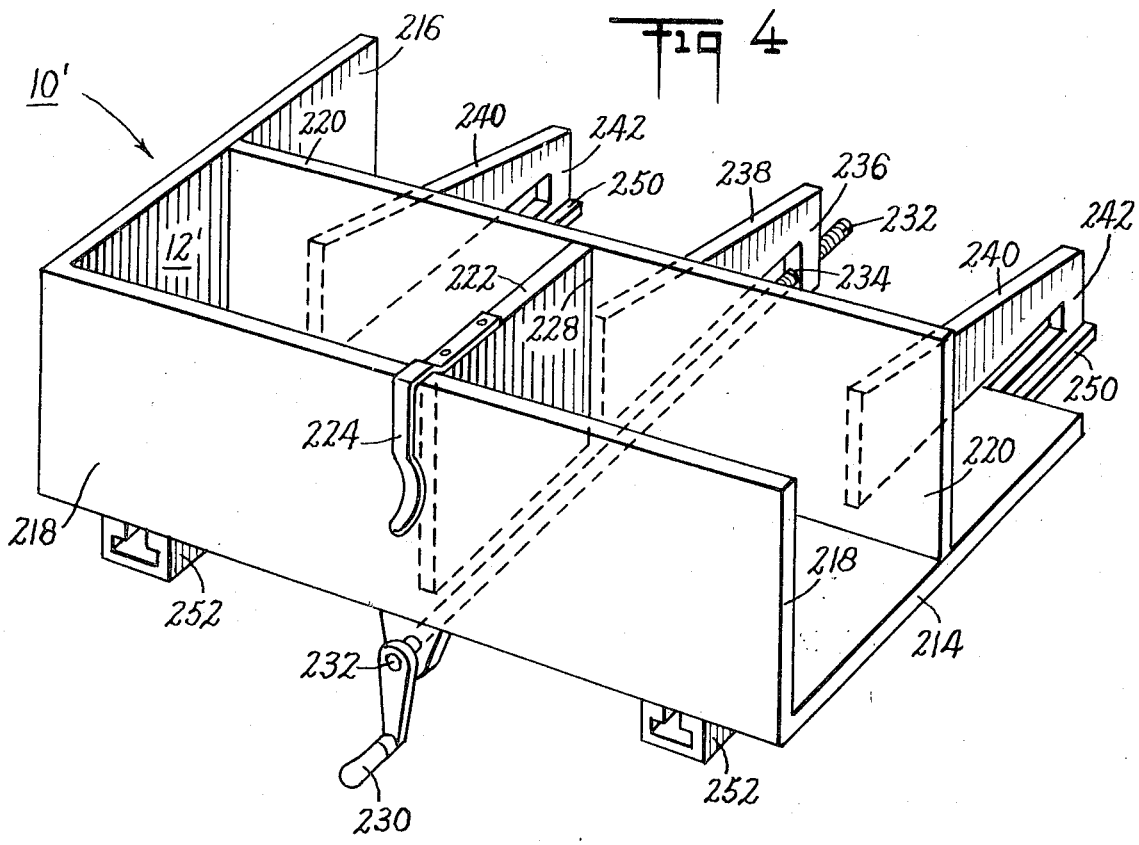

APPARATUS FOR ENCAPSULATING AN ARTICLE WITHIN MOLDED POLYURETHANE

This invention relates to a method and apparatus for preparing a package comprising an article encapsulated in a shock absorbent exterior casing, such as polyurethane or the like, and more in particular, to a method and apparatus for molding a polyurethane foam protective covering and shipping container about an article.

At present, when it is desired to pack an article in a container, for example for shipping purposes, where the article must be cushioned from shocks encountered in transit, it is common to pack the article in a paperboard box within a shock absorbent protective material. Polystyrene is most commonly used and the polystyrene is first formed in a mold to obtain a solid slab having a contoured surface which mates with the exterior surfaces of the article; the article is then "sandwiched" between two or more of the styrene slabs and placed in a paperboard box which is then sealed. This procedure is inherently expensive and inflexible as separate molds must be provided for each article to be packaged, the styrene cushioning pieces must be molded in these molds and the styrene slabs and the article must be manually assembled and inserted in a paperboard box. Additionally, the paperboard boxes are shipped in a flat condition and must be prepared by opening the boxes, the styrene-encased articles placed therein and the boxes sealed.

Additionally, while polystyrene is used because it sets up fast in a heated mold, it is not the best type of plastic material which can be used as a cushioning for shipping articles. A material such as polyurethane is more desirable because of a greater compressive strength but has not been used heretofore because of its relatively longer setup time in a mold.

It is, therefore, an object of the present invention to provide a method and apparatus for encapsulating an article within a polyurethane foam container to form a shipping container for the article without requiring the use of an outer carton.

It is another object of the present invention to provide a method and apparatus for encapsulating an article within a polyurethane foam plastic in a mold which is so constructed as to be adjustable to accommodate a wide range of sizes.

It is a further object of the present invention to provide a method and apparatus for encapsulating an article within a foamed polyurethane plastic material in a rapid and commercially feasible manner so as to lend such a procedure to production line applications.

In a preferred embodiment of the present invention a mold which is adjustable as to size is provided consisting of a baseplate with provision thereon to elevate an article to be encapsulated above the surface of the baseplate. Four upstanding walls are provided which in conjunction with the baseplate define a mold cavity and the walls are adjustable on the base plate thereby to vary the size of the mold cavity. In this manner, articles of varying sizes can be accommodated by the same mold structure. Once an article is placed in its elevated relationship with respect to the baseplate of the mold, and each of the walls of the mold have been adjusted so as to be slightly spaced from the article therein, a foamable polyurethane mixture is sprayed into the cavity and allowed to form a polyurethane foam which completely encapsulates the article therein. Once the foam has set, the walls of the mold form are retracted and the encapsulated article is removed from the mold and can now be shipped as it is encapsulated in a solid energy-absorbing polyurethane container.

In the drawings:

FIG. 1 is a perspective view showing a preferred embodiment of the adjustable mold;

FIG. 2 is a top plan view showing a plurality of adjustable molds arranged in a circular carousel with respect to a central polyurethane-foaming apparatus;

FIG. 3 is a view, partly in section, taken on line 3—3 of FIG. 2; and

FIG. 4 is a perspective view similar to FIG. 1 showing an alternative embodiment for the adjustable mold structure.

With reference now to the drawings and particularly FIG. 1, a mold 10 is provided which defines a mold cavity 12 adapted to hold an article which is to be encapsulated in a cellular plastic material, such as polyurethane. The mold 10 is provided with a baseplate 14 which defines the lower wall of the mold cavity 12 and four upstanding sidewalls 16, 18, 20 and 22 disposed at right angles to each other to define the mold cavity 12. The upstanding walls 16, 18, 20 and 22 are adjustable along the baseplate 14 to vary the size of the mold cavity 12.

A lateral face 24 of wall 16 is parallel to and closely abuts the inside face of wall 22 and, in like manner, the lateral face 26 of wall 18, the lateral face 28 of wall 20 and the lateral face 30 of wall 22 are respectively parallel to, and closely abut, the inside face of walls 16, 18 and 20. Each of the lateral faces 24, 26, 28 and 30 are adapted to slide along the respective inside faces of walls 16, 18, 20 and 22 and also baseplate 14 to increase or decrease the size of the mold cavity 12.

With respect now to FIG. 3 as well, the baseplate 14 of mold 10 is supported on a support plate 32 by opposed pairs of support members 34 and 36, respectively, so that baseplate 14 of mold 10 is slightly elevated with respect to the support plate 32.

The outside face of each wall 16, 18, 20 and 22 is provided with a longitudinal slot 38 which includes grooved upper and lower extensions 40 and 42, respectively, along the length of the slot and opposed pairs of bracket members 44 and 46, respectively, are slidably retained within slots 38. Each of the brackets in bracket pairs 44 and 46 include a slot-contacting face 48 having extending tab members 50 and 52 which are adapted to fit in, and slide within, groove extensions 40 and 42. Hence, the slot-contacting face 48 of each bracket is positively retained within slot 38 while being adapted for slidable disposition therein.

Each of the brackets in bracket pairs 44 and 46 include an angularly disposed leg 54 and a vertically disposed leg segment 56. A threaded bore is provided in each vertical leg segment 56 to threadably receive a worm-screw therein. Bracket pair 44 are interconnected to a common worm-screw 60 and bracket pair 46 are interconnected to a common worm-screw 62. Each worm-screw 60 and 62 has one portion 64 threaded with a right-hand thread 66 with the associated bores 56 of brackets 44 and 46 being similarly threaded and the other end 68 of each worm-screw threaded with a left-hand thread 70 to mate with the left-hand thread in threaded bore 56 of the other of bracket pairs 44 and 46. Worm-screw 60 is rotatably supported within opposed support members 34, for example within a bore 72 in support column 34, and worm-screw 62 is similarly rotatably supported in opposed support members 36. Worm-screws 60 and 62 are disposed to intersect at their approximate midpoints and, as shown in FIG. 3, worm-screw 62 is slightly elevated with respect to worm-screw 60 so that there is a clearance between the two worm-screws 60 and 62.

An electric motor 74 is operably connected to one end of worm-screw 60 and an electric motor 76 is operably connected to one end of worm-screw 62. When activated, motors 74 and 76 cause worm-screws 60 and 62 to rotate and, when the worm-screws 60 and 62 are rotated, the opposed pairs of brackets 44 and 46, since they are threadably engaged on each of the worm-screws 60 and 62, are moved longitudinally along their respective worm-screws. Because each worm-screw 60 and 62 and one of each bracket pairs 44 and 46 are threaded, respectively, with right- and left-hand threads, rotation of the worm-screws will cause movement of bracket pair 44 and bracket pair 46 in opposite directions. Since each of the brackets 44 and 46 are engaged within the slot 38 on respective sidewalls 16, 18, 20 and 22, the movement of the bracket pairs 44 and 46 will also cause movement of respective opposed sidewalls 16-20 and 18-22. Motors 74 and 76 may operate independently so that only the opposed pairs of sideplates 16 and 20 or 18 and 22 may be moved.

Each of the sideplates 16, 18, 20 and 22 have a longitudinally extending slot 78 on their top wall 80. A U-shaped member 82 has one leg 84 secured in the top wall 80 in each sideplate 16, 18, 20 and 22 adjacent the respective abutting lateral face 24, 26, 28 and 30 so that the other leg member 86 of member 82 is slidably disposed within the slot 78 of the contiguous sideplate. Hence, as one sideplate moves relative to its respective adjacent sideplate, the leg 86 of U-shaped member 82 slides along slot 78 and maintains a contacting relationship between any two perpendicularly disposed sideplates. In this manner, when the opposed pairs of sideplates 18 and 22 move, for example away from each other, contact between sideplates 18 and 20 is maintained by U-shaped member 82 and side plate 20 is accordingly moved in the same direction as side plate 18. Concurrently, the U-shaped member 82 interconnecting sideplates 16 and 22 causes sideplate 16 to be moved in the same direction of movement as sideplate 22. Thus, intimate contact between all of the sideplates is maintained when any two of them are moved. Similarly, if sideplates 16 and 20 are moved, sideplates 18 and 22 would also be moved accordingly as a result of the contact maintained by the U-shaped members 82.

While the surfaces of contact between each of the sideplates may be machined to a relatively high finish, so as to reduce friction between the mating surfaces as one side plate is moved relative to the other, a slight gap will exist between the mating surfaces which would allow the seepage of the liquid polymeric-isocyanate mix when this mix is injected into the mold. Accordingly, once the desired mold size is obtained, the slight gap between the abutting lateral faces 24, 26, 28 and 30 and its contiguous sideplate is reduced by actuation of electromagnets 88 and 90 secured to the outside face of each of sideplates 16, 18, 20 and 22. Electromagnets 88 and 90 are suitably connected to a source of electrical energy (not shown) in any conventional manner. Thus, when the electromagnets are energized, they tend to draw the contiguous sideplates together. It is to be understood that while electromagnets have been specifically disclosed as a means to close the gap formed by abutting sideplates, any other suitable means can be used. As an example of alternative constructions which may be employed, pneumatic cylinders may be provided which are pivotally secured to the outside face of walls 16, 18, 20 and 22 having the piston extension secured near the free end of an abutting sidewall. When it is desired to close the gap the piston can be made to retract thus drawing the abutting sidewalls together. Additionally, tension springs could be provided which could be manually installed once the desired mold size has been achieved.

As seen in FIG. 3, an article 92 to be encapsulated in the mold 10 is supported above the baseplate 14 on a plurality of pins 94 to allow the liquid mix injected into the mold to flow under the article. The pins 94 are preferably conically shaped or frustoconically shaped within mold cavity 12 so that after the polyurethane has foamed and set and the sidewalls of the mold retracted to free the now encapsulated article, the polyurethane-encapsulated article may be lifted free of the pins with little resistance. Preferably, four pins are used spaced about the approximate center portion of the mold cavity 12.

Reference is now made to FIG. 2 where there is shown a preferred arrangement for a plurality of molds 10 rotatably disposed about a central polymeric-isocyanate mix dispensing apparatus 96. This may be any commercially available polyurethane froth foam machine such as the Model 19011 froth foam machine manufactured by Pyles Industries. Apparatus 96 has radiating therefrom a flexible liquid-dispensing arm 98 through which the liquid polymeric-isocyanate mix is fed to the exit nozzle 100 (see FIG. 3 as well) and allowed to flow into the mold cavity 12. Arm 98, besides being flexible to allow vertical movement of the dispensing arm, is also pivotally secured to the apparatus 96 as at 102 to allow for proper positioning of the nozzle 100 over a mold 10.

With reference to FIG. 3, it is seen that the support plate 32 is provided with brackets 104 on its underside which carry rotatably mounted wheels 106 therein adapted to ride along circularly disposed tracks 108 supported on a bed 110 secured to vertical legs 112. As shown in FIG. 2, six separate mold units 10 are provided, although any number may be employed, with all the mold units being rotatably disposed so that they rotate freely on tracks 108 about the liquid-distribution apparatus 96. Preferably, each of the support units 32 are secured as at 114 so that the total array of mold units 10 rotate in unison about distribution apparatus 96. In this manner, a continuous production line set up may be obtained. After an article has been placed in a mold 10, and the walls adjusted, in a manner to be explained more fully hereinbelow, and the liquid polymeric-isocyanate mix injected into the mold, the mold is rotated away and allowed to foam and set. By the time this particular mold has moved back to the injecting station, the encapsulated article is ready to be removed and the procedure repeated.

The inside surfaces of the mold cavity 12 preferably are provided with a Teflon lining or a spray-coating of a release agent to which the polyurethane foam will not adhere after it has set. In operation, the article to be encapsulated, also coated with a release agent, if necessary, or enclosed in a plastic bag of polyethylene or the like, to which the polyurethane foam will not adhere, is placed in the open mold so that it rests above the baseplate on the mold cavity on locating pins 94. In the alternative, the article 92 to be encapsulated may be placed on a slab of preformed polyurethane foam which is inserted into the mold cavity 12 and the article 92 placed thereon. At this point, motors 74 and 76 are actuated to rotate worm-screws 60 and 62 so that the opposed bracket pairs 44 and 46 are moved toward each other, thus causing the sidewalls 16, 18, 20 and 22 to close inwardly upon the article 92 within mold cavity 12. Motors 74 and 76 are low power DC motors which are adapted to shut off when walls 16, 18, 20 and 22 contact and apply slight pressure against the article 92 within the mold cavity 12. At this point, the sidewalls of the mold 10 are in direct contact with the article 92 therein and motors 74 and 76 automatically reverse themselves causing opposed pairs of brackets 44 and 46 to move away from each other thus bringing the sidewalls of the mold outwardly away from the article 92. Preferably, the reversal of motors 74 and 76 is only for a predetermined period of time sufficient to withdraw the side walls 16, 18, 20 and 22 of mold 10 a predetermined distance away from the article 92 so that a predetermined thickness for the encapsulating polyurethane foam may be molded about the article 92.

Once the size of mold cavity 12 has been achieved for a particular article 92 therein, the mold 10 is rotated on tracks 108 to the vicinity of the liquid polyurethane discharge nozzle 100 in readiness to receive a predetermined quantity of the liquid polymeric-isocyanate mix which is sprayed into the mold cavity 12.

Since the liquid mix, when it begins to foam, increases in volume on the order of 30 to 1, the amount of liquid mix sprayed into mold 12 must be carefully controlled to insure that after the polyurethane foams, it will not overflow the mold cavity. Accordingly, means are provided to afford a volumetric calculation in order to determine the quantity of polymeric-isocyanate mix or "shot-charge" which must be injected into the mold to sufficiently encapsulate the article 92 once the polyurethane has foamed and set. As an example of the type of apparatus which may be used to make a volumetric calculation, the distance one of the brackets 44 and one of the brackets 46 travels when the mold size is adjusted can be readily determined and correlated to a particular area enclosed by the four sidewalls 16, 18, 20 and 22. A linear rheostat 116 mounted on support plate 32 is positioned beneath the path of travel of the vertical leg segment 56 of bracket 44 and 46 and leg segment 56 carries an electrical contact member 117 which rides along rheostat 116. The rheostat 116 and contact member 117 are operably connected in an electrical circuit (not shown) and the voltage change across rheostat 116 as brackets 44 and 46 move from the inwardmost position, i.e., where sidewalls 16, 18, 20 and 22 are in contact with article 92, to the outermost position provides an indication of the area of the enclosed mold less the area occupied by article 92. In this manner, the relative position of the brackets can be correlated automatically to a particular enclosed area for the mold cavity 12.

In addition, a vertical height measurement is made which, when correlated to the area measurement made by rheostat 116, provides volumetric indication. For this purpose, a boom 118 is provided which is pivotally mounted at 120 to an upstanding support 122 secured to support plate 110 at one station 123, for example where the mix is injected into the mold. One end of boom 118 includes a leg 124 adapted to contact the upper surface of article 92 within mold 10 and the other end of boom 118 is provided with an electrical contact member 126 adapted to slidably contact an arcuate rheostat 128. The portion of boom 118 between pivot 120 and rheostat 128 is counterbalanced by a weight 130 so that the boom is maintained in equilibrium. Rheostat 128 is held in an L-shaped bracket support 132 which is fixed to support 122. As with the rheostats 116, rheostat 128 and contact member 126 are operably connected in an electrical circuit (not shown). Support 122 is pivotally mounted on support plate 110 in any conventional manner, for example shaft 122 may be rotatably supported within a bearing housing 134 on support plate 110, so that boom 118 can be rotated to a position over mold 10 and then rotated away after an appropriate height measurement has been made.

Once an article 92 is placed within mold cavity 12 and the sidewalls 16, 18, 20 and 22 have been adjusted to the proper position, boom 118 is rotated to a position over article 92. The operator then pivots boom 118 about pivot 120 until leg 124 contacts the top of article 92. This pivoting movement will result in movement of contact member 126 along rheostat 128 resulting in an appropriate voltage change in the electrical circuit in which the rheostat 128 and contact member 126 are connected.

The changes in the three voltages across rheostats 116 and rheostat 128 are sent to an electrical control circuit where the changes in voltage are correlated to a particular volume of molded polyurethane necessary to completely encapsulate article 92. This information is then in turn fed to a control device on the dispensing apparatus 96 which then automatically sets the quantity of liquid polymeric-isocyanate mix to be injected for a particular molding operation. Thus, as soon as the operator actuates the apparatus 96, the controls would be automatically set to inject the proper amount of liquid mix so that when the polyurethane has foamed and set, the article 92 would be completely encapsulated. In the alternative, the quantity of liquid to be injected into the mold may be manually set according to the indicated volume needed.

With reference now to FIG. 4, there is shown an alternate embodiment for a mold 10'. The mold 10' may be adjusted to achieve a mold cavity 12' of varying size although not in the finite range of size achieved by the mold 10 shown in FIG. 1. In this embodiment, the baseplate 214 and two vertical walls 216, and 218 are integrally formed to achieve unitary construction. A third upstanding wall 222 is provided at right angles to wall 216 and slidable therealong so that its relative position with respect to wall 218 may be adjusted. The fourth wall 222 of mold 10' is added to complete the mold cavity 12' and includes a clip bracket 224 which overlies wall 218 and holds the wall 222 firmly thereagainst. A plurality of walls 222 are provided with varying lengths and the adjustment of the mold cavity is made by selecting an appropriate length wall 222, moving wall 220 away from wall 218, inserting the selected length wall 222 and then moving wall 220 firmly against free edge 228 of wall 222 to complete the mold cavity 12'. Wall 220 may be manually shifted along baseplate 214 to the desired position but, preferably, is mechanically shifted, i.e., by a motor and worm-screw arrangement, as shown in FIG. 3, or by a manual crank 230 having a worm-screw extension 232 which is threadably received within a threaded bore 234 of a bracket 236. Bracket 236 includes an extension plate 238 which is fastened, as by welding, to the exterior face of movable wall 220. In addition, support brackets 240 are provided on opposite sides of the central adjusting bracket 238 which are also fixed to the exterior surface of movable wall 220. Brackets 240 include an L-shaped leg extension 242 having one leg 250 adapted to slide within a guide track 252 on the underside of baseplate 214. In this manner, discrete adjustments to the mold cavity size may be made by selecting a suitably dimensioned wall 222 and adjusting the position of movable wall 220 so as to closely abut the selected wall 222.

What is claimed is:

1. Apparatus for encapsulating an article within an energy-absorbing solid material comprising:
    an adjustable mold form,
    said mold form including a baseplate defining a bottom of said mold form and at least four upstanding wall members which together with said baseplate define an enclosed mold cavity,
    each said wall being movable with respect to the other three walls and said baseplate thereby to provide a finite variation in the size of the mold cavity,
    each said upstanding wall being disposed perpendicular to an adjacent wall with one vertical edge being in sliding contact with the inside face of the next adjacent wall and the opposed vertical edge being free standing and not in contact with another upstanding wall whereby each said wall is adapted for sliding movement in a path parallel to the inside face of the adjacent wall in sliding contact with the vertical edge and in a path perpendicular to said adjacent wall,
    means operably connected to each said upstanding wall to selectively move each said wall member toward and away from an opposed wall member, and
    means to dispense a liquid foamable plastic mixture into said mold cavity thereby to encapsulate an article therein when said foamable plastic mixture has foamed and set.

2. Apparatus as defined in claim 1 wherein said means to dispense a foamable liquid plastic mixture comprises a liquid polymeric-isocyanate mix-dispensing apparatus to dispense a liquid mixture which upon foaming and setting forms a solid, energy-absorbing polyurethane plastic, and means associated with said baseplate to elevate an article placed within said mold cavity above said baseplate thereby to allow said foamable liquid plastic mixture to flow under said article to completely encapsulate said article when said mixture has foamed and set.

3. Apparatus as defined in claim 2 wherein a plurality of mold forms are provided, each one of said plurality of mold forms being mounted on a movable carriage, each said carriage being adapted to be moved to the vicinity of the discharge nozzle of said liquid mixture-dispensing apparatus to receive a charge of said mix and to be moved away from said apparatus while said mix foams and sets thereby to provide a continuous production line operation.

4. Apparatus as defined in claim 1 wherein opposed pairs of said upstanding walls are operably interconnected so that said opposed pairs of upstanding walls move in opposite directions when moved to vary the size of said mold cavity.

5. Apparatus as defined in claim 4 wherein said means operably interconnecting opposed pairs of said upstanding walls includes bracket members retained by and slidably disposed within a horizontal slot on the outside face of each said upstanding wall, said bracket members including a leg member extending below said base plate, a threaded bore in each said leg member below the plane of the bottom surface of said base plate, and a threaded worm-screw operably engaged within the threaded bores of opposed bracket members.

6. Apparatus as defined in claim 5 wherein one of said opposed pairs of interconnected bracket members and the segment of the worm-screw engaged therewith are threaded with a right-hand thread and the other of said opposed pairs of interconnected bracket members and the segment of the worm-screw engaged therewith are threaded with a left-hand thread, and a motor operably connected to one end of each of said worm-screws to selectively drive each said worm-screws in two directions whereby when said worm-screws are driven in one direction the opposed pairs of upstanding walls operably connected to said worm-screws are caused to move toward each other and when driven in the opposite direction are caused to move away from each other.

7. Apparatus for encapsulating an article within an energy-absorbing solid polyurethane envelope comprising:
an adjustable mold form comprising a baseplate and four upstanding sidewalls defining a mold cavity therein,
said upstanding walls being slidably disposed with respect to each other and said baseplate thereby to vary the internal dimensions of said mold cavity,
means to dispense a foamable liquid polymeric-isocyanate mixture which upon foaming and setting forms a solid, energy-absorbing polyurethane plastic, and
means to determine the volume of the internal mold cavity after the mold is adjusted for a particular article to be encapsulated and to determine the quantity of liquid polymeric-isocyanate mix to be injected into said mold cavity to completely encapsulate said article.

8. Apparatus as defined in claim 7 wherein each said upstanding wall has associated therewith a bracket member slidably retained in a horizontal slot on the outside face of said wall, said bracket including a leg segment extending below said baseplate and having a threaded bore therein, opposed pairs of said brackets being interconnected on a common worm-screw threadably engaged in said bores with one end of said worm-screw being threaded with a right-hand thread and the other end with a left-hand thread whereby when said worm-screw is rotated in one direction the brackets and upstanding walls associated therewith move toward each other and when rotated in the opposite direction the brackets and upstanding walls associated therewith move away from each other, and drive means operably connected to one end of each worm-screw operative to selectively drive said worm-screw in opposite directions of rotation.

9. Apparatus as defined in claim 8 wherein said means to determine the quantity of liquid polymeric-isocyanate mix comprises a rheostat positioned adjacent one end of each said worm-screw, an electrical contact member adapted to slide along each said rheostat and carried by one of said bracket members on each said worm-screw whereby when said upstanding walls are moved from a first position in contact with said article within said mold cavity to a second position a predetermined distance away from said article, the movement of said electrical contacts along each said rheostat is adapted to produce a change in voltage impressed thereacross which is correlated to an area of the enclosed mold cavity less the area occupied by said article, and a boom pivotally mounted intermediate its length above the top of said mold form having one end adapted to pivot into contact with the top of said article and an electrical contact member on its other end, a rheostat having an arcuate shape supported on a support member on which said boom pivots positioned to contact said electrical contact member whereby when said boom is pivoted to a position in contact with said article said electrical contact member in contact with said arcuate rheostat produces a change in the voltage impressed thereacross which together with the area determined by said first-named rheostats produces a volumetric indication of the enclosed mold cavity.

* * * * *